US012659084B2

(12) United States Patent
Fu

(10) Patent No.: US 12,659,084 B2
(45) Date of Patent: Jun. 16, 2026

(54) TRANSIMISSION METHOD, APPARATUS AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 412 days.

(21) Appl. No.: 18/324,860

(22) Filed: May 26, 2023

(65) Prior Publication Data

US 2023/0299887 A1      Sep. 21, 2023

Related U.S. Application Data

(63) Continuation of application No. PCT/CN2020/132205, filed on Nov. 27, 2020.

(51) Int. Cl.
| | |
|---|---|
| *H04L 1/1812* | (2023.01) |
| *H04L 1/1829* | (2023.01) |
| *H04L 5/00* | (2006.01) |

(52) U.S. Cl.
CPC .......... *H04L 1/1812* (2013.01); *H04L 1/1854* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 2017/0302480 A1 | 10/2017 | Kim et al. | |
| 2019/0150181 A1* | 5/2019 | Kim | H04L 1/1896 |
| | | | 370/329 |
| 2019/0319751 A1 | 10/2019 | Chen et al. | |
| 2020/0100284 A1* | 3/2020 | Li | H04W 74/002 |
| 2020/0213044 A1 | 7/2020 | Peng et al. | |

FOREIGN PATENT DOCUMENTS

| | | |
|---|---|---|
| CN | 103873213 A | 6/2014 |
| CN | 109639398 A | 4/2019 |
| CN | 110708146 A | 1/2020 |
| CN | 111147194 A | 5/2020 |
| CN | 111435889 A | 7/2020 |
| WO | 2018-129017 A2 | 7/2018 |

OTHER PUBLICATIONS

Chinese Office Action and Search Report Issued Mar. 21, 2025 in Chinese Patent Application No. 202080003759.9, with English Machine/Partial Translation, 20 pgs.

(Continued)

*Primary Examiner* — Willie J Daniel, Jr.
(74) *Attorney, Agent, or Firm* — Oblon, McClelland, Maier & Neustadt, L.L.P.

(57) ABSTRACT

The present disclosure relates to a transmission method, a transmission apparatus, and a storage medium. The transmission method, which is applied to a terminal, can include determining a hybrid automatic repeat request HARQ process set, and transmitting or retransmitting HARQ-ACK codebook information of partial HARQ processes in the HARQ process set.

14 Claims, 4 Drawing Sheets

Determine a HARQ process set ⟋ S11

Transmit or retransmit HARQ-ACK codebook information of partial HARQ processes in the HARQ process set ⟋ S12

(56) References Cited

OTHER PUBLICATIONS

Written Opinion issued Aug. 26, 2021 in PCT/CN2020/132206 (with English translation), 6 pgs.

Wilus Inc., "Discussion on HARQ-ACK enhancement for URLLC/IIoT", R1-2009246, 3GPP TSG RAN WG1 #103-e, e-Meeting, Oct. 26-Nov. 13, 2020. 7 pages.

ISA State Intellectual Property Office of the People's Republic of China, International Search Report Issued in Application No. PCT/CN2020/132205, Aug. 26, 2021, WIPO, 4 pages.

Intel Corporation "UE HARQ feedback enhancements in Release 17 URLLC/IIoT" 3GPP TSG RAN WG1 #102-e, R1-2005869, Aug. 28, 2020, 4 pages.

Zte et al. "Maintenance on HARQ enhancement for NR-U"3GPP TSG RAN WG1 Meeting #102e, R1-2005602, Aug. 28, 2020, 5 pages.

* cited by examiner

TRANSIMISSION METHOD, APPARATUS AND STORAGE MEDIUM

CROSS-REFERENCE TO RELATED APPLICATION

The present application is a continuation application of International Application No. PCT/CN2020/132205 filed on Nov. 27, 2020, which is incorporated herein by reference in its entirety.

BACKGROUND OF THE INVENTION

Field of the Invention

The present disclosure relates to the field of radio communication technologies, and in particular, to transmission methods, transmission apparatuses and storage media.

Description of the Related Art

In related technologies of communication technology, when a Hybrid Automatic Repeat Request acknowledgement (HARQ-ACK) transmission of a low-priority service conflicts with a high-priority uplink service, the HARQ-ACK information of the low-priority service is discarded if a multiplexing condition is not met.

Therefore, in order to solve the problem of discarding the HARQ-ACK information of the low-priority service, a one-shot HARQ-ACK codebook is proposed, that is, HARQ-ACK information of all downlink hybrid automatic repeat request (HARQ) processes is fed back at one time for retransmitting HARQ-ACK information of low-priority services discarded before. However, the repeated transmission of HARQ-ACK information for all processes in order to retransmit the discarded HARQ-ACK information has a high resource overhead.

SUMMARY OF THE INVENTION

Aspects of the present disclosure provides transmission methods, transmission apparatuses and storage media.

According to a first aspect of an embodiment of the present disclosure, a transmission method is provided, which is applied to a terminal, and the method includes:

determining a hybrid automatic repeat request HARQ process set; transmitting or retransmitting HARQ-ACK codebook information of partial HARQ processes in the HARQ process set.

According to a second aspect of an embodiment of the present disclosure, a transmission method is provided, which is applied to a network side, and the method includes determining partial hybrid automatic repeat request HARQ processes that relate to transmission or retransmission, where the partial HARQ processes are determined based on a HARQ process set.

According to a third aspect of an embodiment of the present disclosure, a transmission apparatus is provided, which is applied to a terminal, and the apparatus includes a determination module, configured to determine a hybrid automatic repeat request HARQ process set; and a transmission module, configured to transmit or retransmit HARQ-ACK codebook information of partial HARQ processes in the HARQ process set.

According to a fourth aspect of an embodiment of the present disclosure, a transmission apparatus is provided, which is applied to a network device, and the apparatus includes a determination module, configured to determine partial hybrid automatic repeat request HARQ processes that relates to transmission or retransmission, wherein the partial HARQ processes are determined based on a HARQ process set.

According to a fifth aspect of an embodiment of the present disclosure, a transmission apparatus is provided, including a processor and a memory storing processor-executable instructions. The processor is configured to execute the transmission method described in the first aspect or any one implementation of the first aspect, or is configured to: execute the transmission method described in the second aspect or any one implementation of the second aspect.

According to a sixth aspect of an embodiment of the present disclosure, a non-transitory computer readable storage medium is provided, which, when instructions in the storage medium are executed by a processor of a mobile terminal, enables the mobile terminal to: execute the transmission method described in the first aspect or any one implementation of the first aspect, or enables the mobile terminal to execute the transmission method described in the second aspect or any one implementation of the second aspect.

It should be understood that the above general descriptions and the following detailed descriptions are merely for exemplary and explanatory purposes, and cannot limit the present disclosure.

BRIEF DESCRIPTION OF THE DRAWINGS

The accompanying drawings herein are incorporated in and constitute a part of this description, illustrate exemplary embodiments consistent with the present disclosure, and together with the description serve to explain the principles of the present disclosure.

DETAILED DESCRIPTION OF THE PREFERRED EMBODIMENTS

Figure 1:
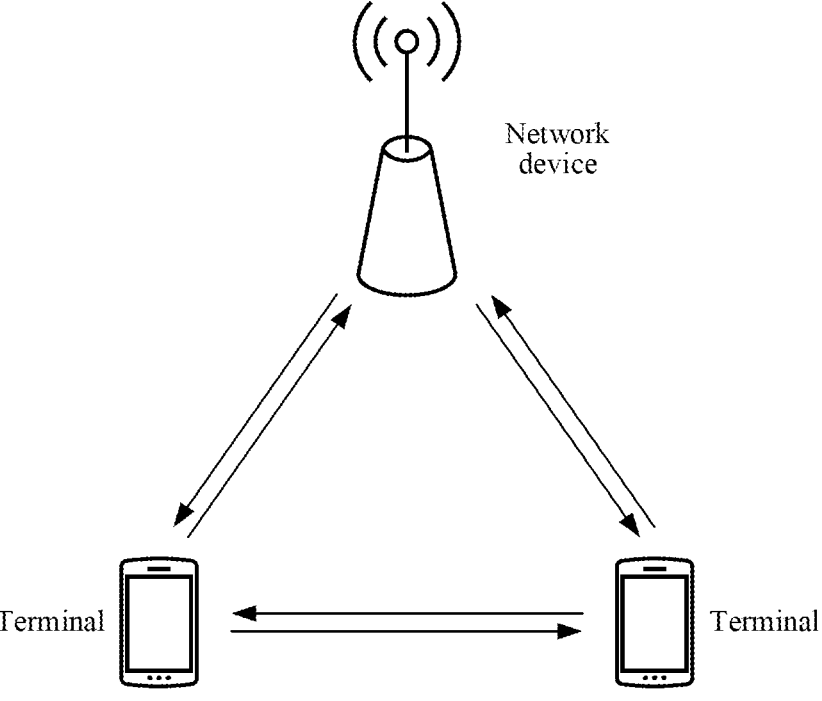
FIG. 1 is a communication system architecture diagram between a network device and a terminal illustrated according to an embodiment of the present disclosure.

Embodiments will be described in detail herein with the examples thereof expressed in the accompanying drawings. When the following description relates to the accompanying drawings, unless specified otherwise, the same numerals in different drawings represent the same or similar elements. The embodiments described in the following exemplary embodiments do not represent all embodiments consistent with the present disclosure. Rather, they are merely examples of apparatuses and methods consistent with some aspects of the present disclosure as detailed in the appended claims.

In a topic of ultra reliable and low latency communication (URLLC) of communication technology, it is proposed that when a transmission of HARQ-ACK information of a low-priority service conflicts with a high-priority uplink service, the HARQ-ACK codebook information of the low-priority service will be discarded if a multiplexing condition is not met. Therefore, in further discussions, a one-shot HARQ-ACK codebook is introduced, that is, a HARQ-ACK feedback mode which feeds back all downlink HARQ processes at one time based on the one-shot HARQ-ACK codebook. The one-shot HARQ-ACK codebook may also be called the Type 3 HARQ-ACK codebook.

For example, a network device (e.g., a base station) is configured with 16 downlink HARQ processes, and the network device may use downlink control information (DCI) to trigger a user equipment (UE) to transmit a one-shot HARQ-ACK codebook, so as to perform a HARQ-ACK feedback of all downlink HARQ processes at one time. After receiving the trigger information, the UE will feed back HARQ-ACK information corresponding to all 16 HARQ processes at one time.

As in the above embodiment, in order to ensure service performance of low priority, for the discarded low priority HARQ-ACK information, it can be retransmitted by using a HARQ-ACK feedback mode that feeds back all downlink HARQ processes information at one time. In other words, the network device uses the DCI to trigger the UE transmitting the one-shot HARQ-ACK codebook, which repeatedly transmits the HARQ-ACK codebook information of the HARQ process corresponding to the low priority that was discarded before. However, because the one-shot HARQ-ACK codebook needs to feed back the HARQ-ACK codebook information of all HARQ processes at one time, not just the discarded HARQ codebook information, the resource overhead is relatively large.

Based on this, the present disclosure provides a transmission method, which can be used to repeatedly transmit HARQ-ACK codebook information.

The technical solution provided by the embodiments of the present disclosure can include the following beneficial effects: the transmission method provided in the present disclosure can transmit HARQ-ACK codebook information corresponding to partial HARQ processes that need to be transmitted or retransmitted, overhead of resources can be reduced during transmission, which effectively avoid resource waste caused by transmitting or retransmitting the HARQ-ACK codebook information corresponding to all HARQ processes.

The present disclosure adopts a feedback mode of Partial one-shot HARQ-ACK codebook, that is, when feeding back HARQ-ACK codebook information, it is possible to transmit or retransmit HARQ-ACK codebook information of partial HARQ processes, thereby effectively reducing resource overhead. FIG. 1 is a communication system architecture diagram between a network device and a terminal illustrated according to an embodiment of the present disclosure. The repetitive transmission method provided by the present disclosure can be applied to a communication system architecture diagram shown in FIG. 1. As shown in FIG. 1, a terminal receives Partial one-shot HARQ-ACK feedback triggered by a network device, and then feeds back HARQ-ACK information of one or more HARQ processes that needs to be transmitted to the network device.

It can be understood that a communication system between the network device and terminals shown in FIG. 1 is only a schematic illustration, and a radio communication system may further include other network devices, for example, a core network device, a radio relay device and a radio backhaul device, etc., which are not shown in FIG. 1. Embodiments of the present disclosure do not limit the number of network devices and terminals included in the radio communication system.

It can be further understood that the radio communication system of the embodiments of the present disclosure is a network providing radio communication functions. A radio communication system can adopt different communication technologies, for example, a code division multiple access (CDMA), a wideband code division multiple access (WCDMA), a time division multiple access (TDMA), a frequency division multiple access (FDMA), an orthogonal frequency-division multiple access (OFDMA), a single carrier FDMA (SC-FDMA), a carrier sense multiple access with collision avoidance. According to capacity, speed, latency and other factors of different networks, networks can be divided into 2G (generation) networks, 3G networks, 4G networks or future evolution networks, such as 5G networks, which can also be referred to as New Radio (NR). For ease of description, the present disclosure will sometimes refer to a radio communication network simply as a network.

Further, a network device involved in the present disclosure can also be called a radio access network device. The radio access network device can be: a base station, an evolved node B (base station), a home base station, an access point (AP) in a wireless fidelity (WIFI) system, a radio relay node, a radio backhaul node, a transmission point (TP), a transmission and reception point (TRP), etc., and it can also be gNB in an NR system, or it can also be a component or part of device that constitutes a base station. When it is a vehicle to everything (V2X) communication system, the network device can also be an in-vehicle device. It should be understood that in the embodiments of the present disclosure, there are no limitations on specific technologies and specific device forms used by the network device.

Further, the terminal involved in the present disclosure can also be called a terminal device, a User Equipment (UE), a Mobile Station (MS), a Mobile Terminal (MT), etc., which is a device that provides voice and/or data connectivity to users, for example, the terminal can be a handheld device, an in-vehicle device, etc., with wireless connection functions. At present, some examples of terminals are: a mobile phone, a pocket personal computer (PPC), a personal digital assistant, a personal digital assistant (PDA), a notebook computer, a tablet computer, a wearable device, or an in-vehicle mounted device, etc. In addition, when it is a vehicle to everything (V2X) communication system, the terminal device can also be an in-vehicle device. It should be understood that the embodiments of the present disclosure do not limit specific technologies and specific device forms used by the terminal.

The embodiments of the present disclosure will explain the transmission method provided by the present disclosure in combination with the embodiment and the corresponding accompanying drawings.

Figure 2:
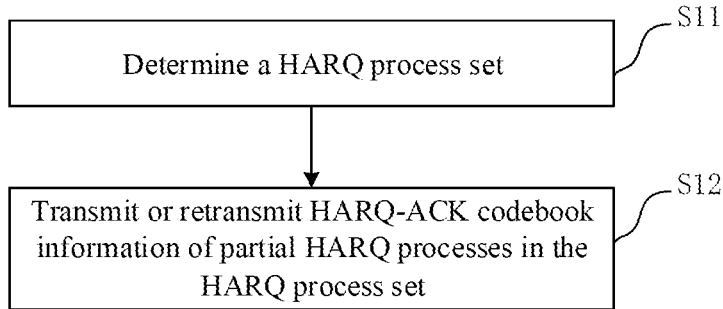
FIG. 2 is a flowchart of a transmission method illustrated according to an embodiment of the present disclosure.

FIG. 2 is a flowchart of a transmission method illustrated according to an embodiment of the present disclosure. As shown in FIG. 2, the transmission method is used in the terminal and includes the following steps.

At step S11, a HARQ process set is determined.

At step S12, HARQ-ACK codebook information of partial HARQ processes in the HARQ process set is transmitted or retransmitted.

In the embodiments of the present disclosure, a HARQ process set is determined, in other words, the terminal determines a total number of downlink HARQ processes configured by a network device. The network device sends downlink control information, and introduces a radio resource control signaling configurable information domain in the downlink control information to indicate the terminal to feed back HARQ-ACK codebook information of partial HARQ processes in the HARQ process set. According to the received downlink control information, the terminal transmits the HARQ-ACK codebook information of partial HARQ processes in the HARQ process set.

In the transmission method provided in the embodiment of the present disclosure, the terminal determines partial HARQ processes that relate to transmission or retransmission based on received downlink control information, and further determines HARQ-ACK codebook information corresponding to the partial HARQ processes that need to be transmitted or retransmitted, and transmits the HARQ-ACK codebook information that needs to be transmitted or retransmitted.

In the embodiment of the present disclosure, the network device sends downlink control information, and the downlink control information includes a first information domain. The first information domain includes an indicator for indicating the partial HARQ processes that relates to transmission or retransmission. According to the indicator included in the received downlink control information, the terminal determines the partial HARQ processes that need to be transmitted or retransmitted, and feeds back the HARQ-ACK codebook information corresponding to these partial HARQ processes. It should be noted that in the present disclosure, for convenience of description, an information domain introduced in the downlink control information is called a first information domain.

In some embodiments of the present disclosure, according to the transmission method provided by the present disclosure, the indicator for indicating the partial HARQ processes that relates to transmission or retransmission may include a bit. In the embodiment of the present disclosure, according to the number of bits (i.e., indicators) introduced in the first information domain, it can be determined that all HARQ processes included in the HARQ process set are divided into a first number of HARQ process groups. In the embodiment of the present disclosure, the first number of HARQ process groups is determined based on the number of bits introduced in the first information domain. In other words, if the number of bits introduced in the first information domain is N bits, all HARQ processes included in the HARQ process set can be divided into N groups.

In the embodiment of the present disclosure, a size of a bitmap is determined according to the determined number of bits introduced in the first information domain, and those partial HARQ processes that relates to transmission or retransmission in the HARQ process set are indicated by means of the bitmap, where indicators included in the first information domain are respective bits in the bitmap.

In some examples, a network device (such as a base station) may configure 16 HARQ processes for a terminal, and process numbers of the 16 HARQ processes are 0 to 15. Then it is determined that all HARQ processes included in the HARQ process set are 16, and the number of bits introduced in the downlink control information may be 4 bits, then the 16 HARQ processes included in the HARQ process set can be divided into 4 groups, where the four HARQ process groups respectively include HARQ processes with process numbers 0-3 for the HARQ processes included in the first group, 4-7 for the HARQ processes included in the second group, 8-11 for the HARQ processes included in the third group, and 12-15 for the HARQ processes included in the fourth group. In the embodiment of the present disclosure, different bits and different HARQ process groups can be indicated to have a one-to-one correspondence based on a communication protocol regulation or a signaling instruction. In other words, a corresponding relationship between each bit in the bitmap and each HARQ process group is determined. And a bit value of 1 can be used to indicate that a corresponding HARQ process group that relates to transmission or retransmission, and a bit value of 0 can be used to indicate that a corresponding HARQ process group that does not relate to transmission or retransmission. Of course, this is only an example and is not a specific limitation of the present disclosure. Of course, it is also possible to use a value of 0 to indicate a need for transmission or retransmission and a value of 1 to indicate that there is no need for transmission or retransmission. The present disclosure takes a value of 1 to indicate a need for transmission or retransmission and a value of 0 to indicate that there is no need for transmission or retransmission as an example for explanation.

For example, if the number of bits introduced in the first information domain is 4 and the bitmap is 0011, the terminal determines that the HARQ processes related to transmission or retransmission are the third and fourth groups, and transmits HARQ-ACK codebook information corresponding to the third and fourth groups of HARQ processes.

In some embodiments of the present disclosure, according to the transmission method provided by the present disclosure, the indicator for indicating the partial HARQ processes that relate to transmission or retransmission may include a bit. It is also possible to divide HARQ processes into two groups, and use one bit to indicate one HARQ process group in the two groups that need transmission or retransmission operation.

In the embodiment of the present disclosure, if the number of bits (i.e., indicators) introduced in the first information domain is 1, all the HARQ processes included in the HARQ process set can be divided into a second number of HARQ process groups. The second number of HARQ process groups is 2 HARQ process groups. It can be determined by the communication protocol regulation or signaling instruction that adopting a bit value of 1 to indicate that the HARQ process group that relates to transmission or retransmission is the first HARQ process group, and adopting a bit value of 0 to indicate that the HARQ process group that relates to transmission or retransmission is the second HARQ process group. In the embodiments of the present disclosure, the number of HARQ processes respectively included in two HARQ process groups may be equal or unequal, where the process numbers including HARQ processes may be continuous or discontinuous, and are not specifically limited in the present disclosure.

In some embodiments of the present disclosure, according to the transmission method provided by the present disclosure, the indicator for indicating the partial HARQ processes that relate to transmission or retransmission may include one or more bits. The way that a network device (such as a base station) or a terminal calls a HARQ process is generally based on the process number of the HARQ process. Therefore, in the embodiment of the present disclosure, the number of HARQ processes that need to be transmitted or retransmitted can be indicated by the values of one or more bits, and the number of HARQ processes that relate to transmission or retransmission in the HARQ process set can be determined according to the values of this or these bits (i.e., indicators) introduced in the first information domain. It should be understood that the number of HARQ processes that need transmission or retransmission operation may be determined in turn based on the process number of HARQ process.

In the embodiment of the present disclosure, it is also possible to determine the number of indicators (such as the third number) for the number of HARQ process groups that relate to transmission or retransmission based on the first information domain, divide the HARQ process set into a fourth number of HARQ process groups, in other words, determine the number of bits indicating the number of HARQ process groups that relate to transmission or retransmission. One indicator occupies one bit, and the number of HARQ process groups is determined according to the number of bits introduced in the first information domain. For example, if the bits introduced in the first information domain are N bits, it is determined that all HARQ processes included in the HARQ process set can be divided into $2^{N}$ groups.

In some examples, a network device (such as a base station) may configure 16 HARQ processes for a terminal, and process numbers of the 16 HARQ processes are 0 to 15. Then it is determined that all HARQ processes included in the HARQ process set are 16, and the third number of bits introduced in the downlink control information may be 2 bits, then the 16 HARQ processes included in the HARQ process set can be divided into 4 groups, where the four HARQ process groups respectively include HARQ processes with process numbers 0-3 for the HARQ processes included in the first group, 4-7 for the HARQ processes included in the second group, 8-11 for the HARQ processes included in the third group, and 12-15 for the HARQ processes included in the fourth group. In the embodiment of the present disclosure, based on the communication protocol regulation or the signaling instruction, when these two bit values are 01, it indicates that the number of HARQ process groups that relate to transmission or retransmission is the first one group of HARQ processes, that is, HARQ-ACK codebook information corresponding to the process number 0-3 of HARQ processes is transmitted or retransmitted. When the value is 10, it indicates that the number of HARQ process groups that relate to transmission or retransmission is first two groups of HARQ processes, that is, HARQ-ACK codebook information corresponding to the process numbers 0-3 and 4-7 of the HARQ processes is transmitted or retransmitted. When the value is 11, it indicates that the number of HARQ process groups that relate to transmission or retransmission is first three groups of HARQ processes, that is, HARQ-ACK codebook information corresponding to the process numbers 0-3 and 4-7 and 8-11 of the HARQ processes is transmitted or retransmitted. If it is necessary to transmit or retransmit all the HARQ processes in the HARQ process set, an indication with a value of 00 for these two bits can be adopted, or the network side can also use an indication method of transmitting one-shot HARQ-ACK codebook to transmit or retransmit feedback information of all HARQ processes.

Of course, one bit can further be used to divide the HARQ processes set into two groups. When the value of the bit is 0, it indicates transmission or retransmission of feedback information of a previous group (i.e. the first group) of HARQ processes, that is, HARQ-ACK codebook information corresponding to the previous group of HARQ processes; and when the value of the bit is 1, it indicates transmission or retransmission of HARQ-ACK codebook information corresponding to all HARQ processes in the HARQ process set.

In all embodiments of the present disclosure, it should be noted that the number of HARQ processes included in each group of HARQ processes may be different or the same, and the present disclosure is only an example, not a specific limitation.

In the embodiment of the present disclosure, an indicator for indicating partial HARQ processes that need to be transmitted or retransmitted may be determined based on radio resource control (RRC) signaling.

Based on the same/similar idea of conception, an embodiment of the present disclosure further provides a transmission method.

Figure 3:
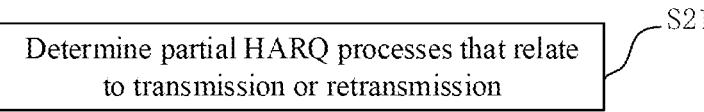
FIG. 3 is a flowchart of another transmission method illustrated according to an embodiment of the present disclosure.

FIG. 3 is a flowchart of a transmission method illustrated according to an embodiment of the present disclosure. As shown in FIG. 3, the transmission method is used in a network side and includes the following steps.

At step S21, partial HARQ processes that relate to transmission or retransmission are determined.

In the embodiment of the present disclosure, the partial HARQ processes that relate to transmission or retransmission are determined based on a HARQ process set.

In the embodiment of the present disclosure, a HARQ process set is determined, in other words, the terminal determines a total number of downlink HARQ processes configured by a network device. The network device sends downlink control information, and introduces a radio resource control signaling configurable information domain in the downlink control information to indicate the terminal to feed back HARQ-ACK codebook information of partial HARQ processes in the HARQ process set. According to the received downlink control information, the terminal transmits the HARQ-ACK codebook information of partial HARQ processes in the HARQ process set.

In the transmission method provided in the embodiment of the present disclosure, the terminal determines partial HARQ processes that relate to transmission or retransmission based on received downlink control information, and further determines the HARQ-ACK codebook information corresponding to the partial HARQ processes that need to be transmitted or retransmitted, and transmits the HARQ-ACK codebook information that needs to be transmitted or retransmitted.

In the embodiment of the present disclosure, the network device sends downlink control information, and the downlink control information includes a first information domain. The first information domain includes an indicator for indicating the partial HARQ processes that relate to transmission or retransmission. According to the indicator included in the received downlink control information, the terminal determines the partial HARQ processes that need to be transmitted or retransmitted, and feeds back the HARQ-ACK codebook information corresponding to these partial HARQ processes. It should be noted that in the present disclosure, for convenience of description, an information domain introduced in the downlink control information is called a first information domain.

In some embodiments of the present disclosure, according to the transmission method provided by the present disclosure, the indicator for indicating the partial HARQ processes that relate to transmission or retransmission may include a bit. In the embodiment of the present disclosure, according to the number of bits (i.e., indicators) introduced in the first information domain, it can be determined that all HARQ processes included in the HARQ process set are divided into a first number of HARQ process groups. In the embodiment of the present disclosure, the first number of HARQ process groups is determined based on the number of bits introduced in the first information domain. In other words, if the number of bits introduced in the first information domain is N bits, all HARQ processes included in the HARQ process set can be divided into N groups.

In the embodiment of the present disclosure, a size of a bitmap is determined according to the determined number of bits introduced in the first information domain, and which partial HARQ processes that relates to transmission or retransmission in the HARQ process set that are indicated by means of the bitmap, where the indicators included in the first information domain are respective bits in the bitmap.

In some examples, a network device (such as a base station) configures 16 HARQ processes for a terminal, and process numbers of the 16 HARQ processes are 0 to 15. Then it is determined that all HARQ processes included in the HARQ process set are 16, and the number of bits introduced in the downlink control information is 4 bits, then the 16 HARQ processes included in the HARQ process set can be divided into 4 groups, where the four HARQ process groups respectively include HARQ processes with process numbers 0-3 for the HARQ processes included in the first group, 4-7 for the HARQ processes included in the second group, 8-11 for the HARQ processes included in the third group, and 12-15 for the HARQ processes included in the fourth group. In the embodiment of the present disclosure, different bits and different HARQ process groups can be indicated to have a one-to-one correspondence based on a communication protocol regulations or a signaling instruction. In other words, a corresponding relationship between each bit in the bitmap and each HARQ process group is determined. And a bit value of 1 can be used to indicate a corresponding HARQ process group that relates to transmission or retransmission, and a bit value of 0 can be used to indicate that a corresponding HARQ process group that does not relate to transmission or retransmission. Of course, this is only an example and is not a specific limitation of the present disclosure. Of course, it is also possible to use a value of 0 to indicate a need for transmission or retransmission and a value of 1 to indicate a HARQ process that there is no need for transmission or retransmission. The present disclosure takes a value of 1 to indicate a need for transmission or retransmission and a value of 0 to indicate a HARQ process that there is no need for transmission or retransmission as an example for explanation.

For example, if the number of bits introduced in the first information domain is 4 and the bitmap is 0011, the terminal determines that the HARQ processes related to transmission or retransmission are the third and fourth groups, and the HARQ-ACK codebook information corresponding to the third and fourth groups of HARQ processes is transmitted.

In some embodiments of the present disclosure, according to the transmission method provided by the present disclosure, the indicator for indicating the partial HARQ processes that relate to transmission or retransmission may include a bit. It is also possible to divide HARQ processes into two groups, and use one bit to indicate one HARQ process group in the two groups that need transmission or retransmission.

In the embodiment of the present disclosure, if the number of bits (i.e., indicators) introduced in the first information domain is 1, all the HARQ processes included in the HARQ process set can be divided into a second number of HARQ process groups. The second number of HARQ process groups is 2 HARQ process groups. It can be determined by communication protocol regulations or signaling instructions that adopting a bit value of 1 to indicate that the HARQ process group that relates to transmission or retransmission is the first HARQ process group, and adopting a bit value of 0 to indicate that the HARQ process group that relates to transmission or retransmission. In the embodiment of the present disclosure, the number of HARQ processes included in two HARQ process groups may be equal or unequal, where the process numbers including HARQ processes may be continuous or discontinuous, and are not specifically limited in the present disclosure.

In some embodiments of the present disclosure, according to the transmission method provided by the present disclosure, the indicator for indicating the partial HARQ processes that relate to transmission or retransmission may include one or more bit. The way that a network device (such as a base station) or a terminal calls a HARQ process is generally based on the process number of the HARQ process. Therefore, in the embodiment of the present disclosure, the number of HARQ processes that need to be transmitted or retransmitted can be indicated by the values of one or more bits, and the number of HARQ processes that relate to transmission or retransmission in the HARQ process set can be determined according to the values of this or these bits (i.e. indicators) introduced in the first information domain. It should be understood that the number of HARQ processes that need transmission or retransmission operation may be determined in turn based on the process number of HARQ process.

In the embodiment of the present disclosure, it is also possible to determine the number of indicators (such as the third number) for the number of HARQ process groups that relate to transmission or retransmission based on the first information domain, divide the HARQ process set into the fourth number of HARQ process groups, in other words, determine the number of bits indicating the number of HARQ process groups that relate to transmission or retransmission. One indicator occupies one bit, and the number of HARQ process groups is determined according to the number of bits introduced in the first information domain. For example, if the bits introduced in the first information domain are N bits, it is determined that all HARQ processes included in the HARQ process set can be divided into $2^{N}$ groups.

In some examples, a network device (such as a base station) configures 16 HARQ processes for a terminal, and process numbers of the 16 HARQ processes are 0 to 15. Then it is determined that all HARQ processes included in the HARQ process set are 16, and the third number of bits introduced in the downlink control information is 2 bits, then the 16 HARQ processes included in the HARQ process set can be divided into 4 groups, where the four HARQ process groups respectively include HARQ processes with process numbers 0-3 for the HARQ processes included in the first group, 4-7 for the HARQ processes included in the second group, 8-11 for the HARQ processes included in the third group, and 12-15 for the HARQ processes included in the fourth group. In the embodiment of the present disclosure, based on the communication protocol regulation or the signaling instruction, when these two bit values are 01, it indicates that the number of HARQ process groups that relate to transmission or retransmission is the first one group of HARQ processes, that is, HARQ-ACK codebook information corresponding to the process number 0-3 of HARQ processes is transmitted or retransmitted. When the value is 10, it indicates that the number of HARQ process groups that relate to transmission or retransmission is first two groups of HARQ processes, that is, HARQ-ACK codebook information corresponding to the process numbers 0-3 and 4-7 of the HARQ processes is transmitted or retransmitted. When the value is 11, it indicates that the number of HARQ process groups relate to transmission or retransmission is first three groups of HARQ processes, that is, HARQ-ACK codebook information corresponding to the process numbers 0-3 and 4-7 and 8-11 of the HARQ processes is transmitted or retransmitted. If it is necessary to transmitted or retransmit all the HARQ processes in the HARQ process set, an indication with a value of 00 for these two bits can be adopted, or the network side can also be determined to use an indication method of transmitting one-shot HARQ-ACK codebook to transmit or retransmit feedback information of all HARQ processes.

Of course, one bit can further be used to divide the HARQ processes set into two groups. When the value of the bit is 0, it indicates transmission or retransmission of feedback information of a previous group (i.e. the first group) of HARQ processes, that is, HARQ-ACK codebook information corresponding to the previous group of HARQ processes; and when the value of the bit is 1, it indicates transmission or retransmission of HARQ-ACK codebook information corresponding to all HARQ processes in the HARQ process set.

In all embodiments of the present disclosure, it should be noted that the number of HARQ processes included in each group of HARQ processes may be different or the same, and the present disclosure is only an example, not a specific limitation.

In the embodiment of the present disclosure, an indicator for indicating partial HARQ processes that need to be transmitted or retransmitted may be determined based on radio resource control (RRC) signaling.

Based on the same idea of conception, an embodiment of the present disclosure further provides a transmission apparatus.

It can be understood that, in order to realize the above functions, the transmission apparatus provided by the embodiment of the present disclosure includes corresponding hardware structures and/or software modules for performing various functions. Combining the units and algorithm steps of various examples disclosed in the embodiments of the present disclosure, the embodiments of the present disclosure can be realized in the form of hardware or a combination of hardware and computer software. Whether a function is executed by hardware or computer software drives hardware depends on a specific application and a design constraint of the technical solution. Those skilled in the art can use different methods to realize described functions for each specific application, but this realization should not be considered beyond the scope of the technical solution of the embodiments of the present disclosure.

Figure 4:
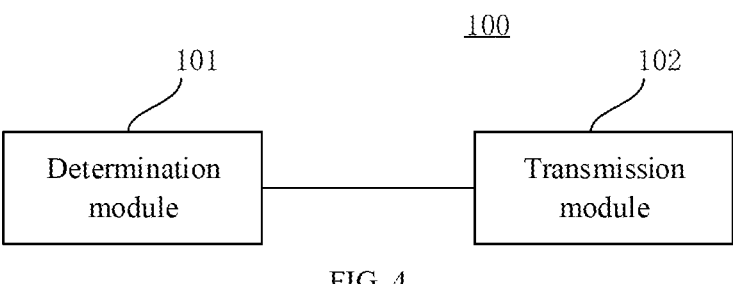
FIG. 4 is a block diagram of a transmission apparatus illustrated according to an embodiment of the present disclosure.

FIG. 4 is a block diagram illustrating an apparatus 100 for transmitting information according to an example. Referring to FIG. 4, the apparatus is applied to a terminal and includes a determination module 101 and a transmission module 102.

The determination module 101 is configured to determine a hybrid automatic repeat request HARQ process set. The transmission module 102 is configured to transmit or retransmit HARQ codebook information of partial HARQ processes in the HARQ process set.

In the embodiment of the present disclosure, the determination module 101 is further configured to determine partial HARQ processes that relate to transmission or retransmission.

In the embodiment of the present disclosure, the determination module 101 is configured to determine the partial HARQ processes that relate to transmission or retransmission based on a first information domain in downlink control information, where the first information domain includes an indicator for indicating the partial HARQ processes that relate to transmission or retransmission.

In the embodiment of the present disclosure, the HARQ process set includes a first number of HARQ process groups, and the first information domain includes a bitmap for indicating the first number of HARQ process groups, and the indicator is the first number of bits in the bitmap.

In the embodiment of the present disclosure, the HARQ process set includes a second number of HARQ process groups, and the first information domain includes an indicator for specifying HARQ process groups that relate to transmission or retransmission among the second number of HARQ process groups, and the indicator is a value of a bit.

In the embodiment of the present disclosure, the HARQ process set includes a fourth number of HARQ process groups, and the first information domain includes a third number of indicators, the third number of indicators is used to indicate the number of HARQ process groups that relate to transmission or retransmission, and the third number of indicators is a third number of bits.

In the embodiment of the present disclosure, the fourth number of HARQ process groups is determined based on the third number.

In the embodiment of the present disclosure, the indicator for indicating the partial HARQ processes that relate to transmission or retransmission is determined based on a radio resource control signaling.

Figure 5:
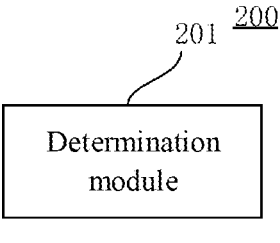
FIG. 5 is a block diagram of another transmission apparatus illustrated according to an embodiment of the present disclosure.

FIG. 5 is a block diagram illustrating an apparatus 200 for transmitting information according to an example. Referring to FIG. 5, the apparatus is applied to a network side and includes a determination module 201.

The determination module 201 is configured to determine partial hybrid automatic repeat request HARQ processes that relate to transmission or retransmission, wherein the partial HARQ processes are determined based on a HARQ process set.

In an example, the transmission apparatus is further configured to:

sending downlink control information, where the downlink control information includes a first information domain, and the first information domain includes an indicator for indicating the partial HARQ processes that relate to transmission or retransmission.

In the embodiment of the present disclosure, the HARQ process set includes a first number of HARQ process groups, and the first information domain includes a bitmap for indicating the first number of HARQ process groups, and the indicator is the first number of bits in the bitmap.

In the embodiment of the present disclosure, the HARQ process set includes a second number of HARQ process groups, and the first information domain includes an indicator for specifying HARQ process groups that relate to transmission or retransmission among the second number of HARQ process groups, and the indicator is a value of a bit.

In the embodiment of the present disclosure, the HARQ process set includes a fourth number of HARQ process groups, and the first information domain includes a third number of indicators, the third number of indicators is used to indicate the number of HARQ process groups that relate to transmission or retransmission, and the third number of indicators is a third number of bits.

In the embodiment of the present disclosure, the fourth number of HARQ process groups is determined based on the third number.

In the embodiment of the present disclosure, the indicator for indicating the partial HARQ processes that need to be transmitted or retransmitted is determined based on a radio resource control signaling.

Specific manners for devices in the apparatus in the foregoing embodiment to perform operations have been described in detail in the embodiments of the method. Details are not described herein again.

Figure 6:
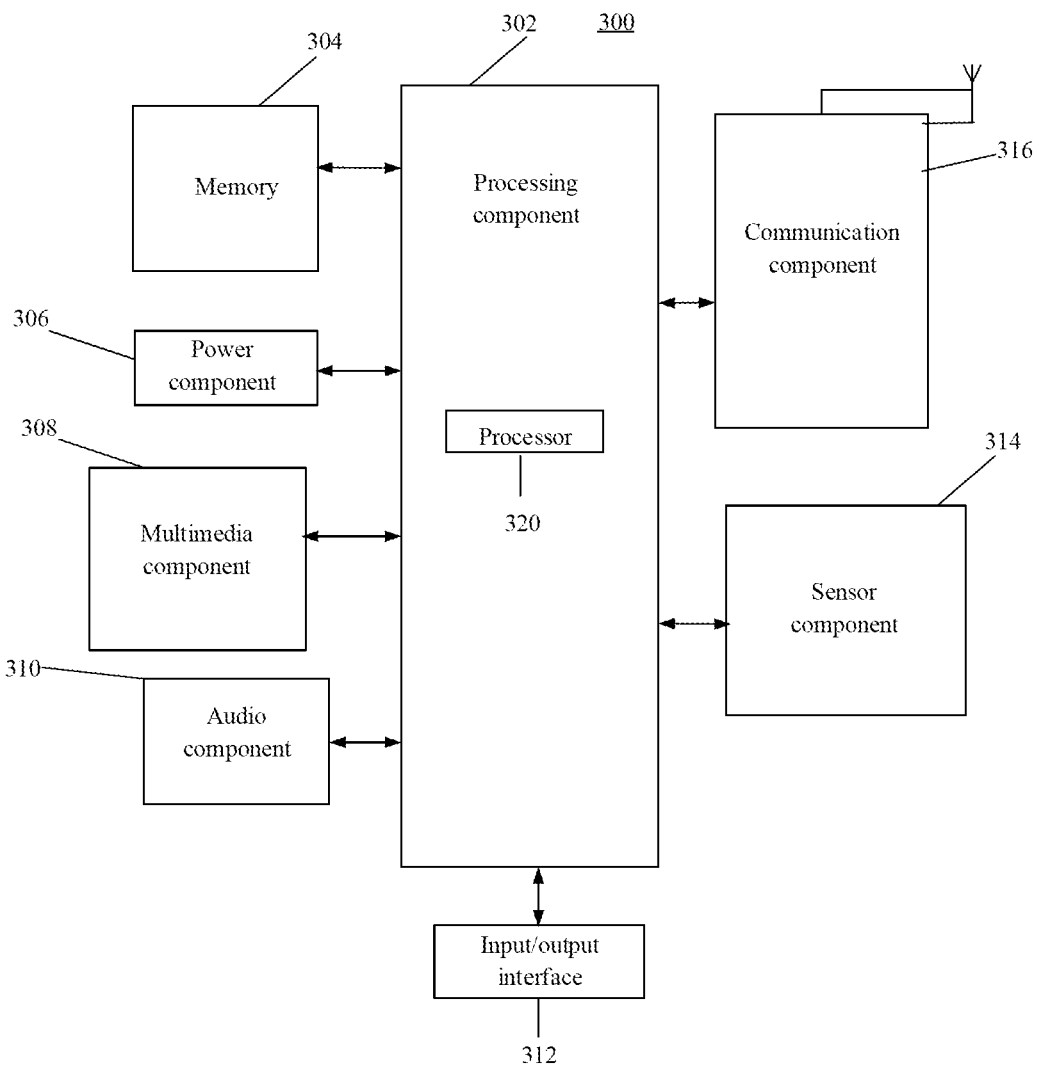
FIG. 6 is a block diagram of an apparatus for transmission illustrated according to an embodiment of the present disclosure.

FIG. 6 is a block diagram of an apparatus 300 for transmission illustrated according to an embodiment of the present disclosure. For example, the apparatus 300 can be a mobile phone, a computer, a digital broadcast terminal, a message transmitting and receiving device, a gaming console, a tablet device, a medical device, a fitness device, a personal digital assistant, and the like.

Referring to FIG. 6, the apparatus 300 can include one or more of the following components: a processing component 302, a memory 304, a power component 306, a multimedia component 308, an audio component 310, an input/output (I/O) interface 312, a sensor component 314, and a communication component 316.

The processing component 302 usually controls overall operations of the apparatus 300, such as operations related to display, a telephone call, data communication, a camera operation and a record operation. The processing component 302 may include one or more processors 320 to execute instructions to complete all or a part of the blocks of the above methods. In addition, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store different types of data to support the operations of the apparatus 300. Examples of such data include instructions, contact data, phonebook data, messages, pictures, videos, and so on for any application or method that operates on the apparatus 300. The memory 304 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 306 supplies power for different components of the apparatus 300. The power component 306 may include a power supply management system, one or more power supplies, and other components associated with generating, managing and distributing power for the apparatus 300.

The multimedia component 308 includes a screen for providing an output interface between the apparatus 300 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 308 may include a front camera and/or a rear camera. When the apparatus 300 is in an operation mode, such as a shooting mode or a video mode, the front camera and/or the rear camera can receive external multimedia data. Each of the front camera and the rear camera may be a fixed optical lens system or have focal length and optical zooming capability.

The audio component 310 is configured to output and/or input an audio signal. For example, the audio component 310 may include a microphone (MIC). When the apparatus 300 is in an operating mode, such as a call mode, a recording mode and a speech recognition mode, the microphone is configured to receive an external audio signal. The received audio signal may be further stored in the memory 304 or sent via the communication component 316. In some examples, the audio component 310 further includes a speaker for outputting an audio signal.

The I/O interface 312 may provide an interface between the processing component 302 and peripheral interface modules. The above peripheral interface modules may include a keyboard, a click wheel, buttons and so on. These buttons may include but not limited to, a home button, a volume button, a start button and a lock button.

The sensor component 314 includes one or more sensors for providing state assessments in different aspects for the apparatus 300. For example, sensor component 314 can detect an open/closed state of the apparatus 300, a relative positioning of components, such as the display and keypad of the apparatus 300, and sensor component 314 can also detect a change in position of device 300 or a component of the apparatus 300, the presence or absence of user contact with the apparatus 300, orientation or acceleration/deceleration of the apparatus 300, and temperature change of the apparatus 300. The sensor component 314 may include a proximity sensor for detecting the existence of a nearby object without any physical touch. The sensor component 314 may also include a Complementary Metal-Oxide-Semiconductor (CMOS) or Charged Coupled Device (CCD) image sensor applied in an imaging application. In some embodiments, the sensor component 314 may further include an acceleration sensor, a gyro sensor, a magnetic sensor, a pressure sensor, or a temperature sensor.

The communication component 316 is configured to facilitate wired or wireless communication between the apparatus 300 and other devices. The apparatus 300 may access a wireless network based on any communication standard, such as WiFi, 2G or 3G, or a combination thereof. In an embodiment of the present disclosure, the communication component 316 receives a broadcast signal or broadcast related information from an external broadcast management system via a broadcast channel. In an embodiment of the present disclosure, the communication component 316 may also include a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an embodiment of the present disclosure, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the methods.

In an embodiment of the present disclosure, a non-transitory computer readable storage medium including instructions, such as the memory 304 including instructions, is further provided. The above instructions may be executed by the processor 320 of the apparatus 300 to complete the above method. For example, the non-transitory computer readable storage medium may be a Read-Only Memory (ROM), a Random Access Memory (RAM), a CD-ROM, a magnetic tape, a floppy disk and an optical data storage device, etc.

Figure 7:
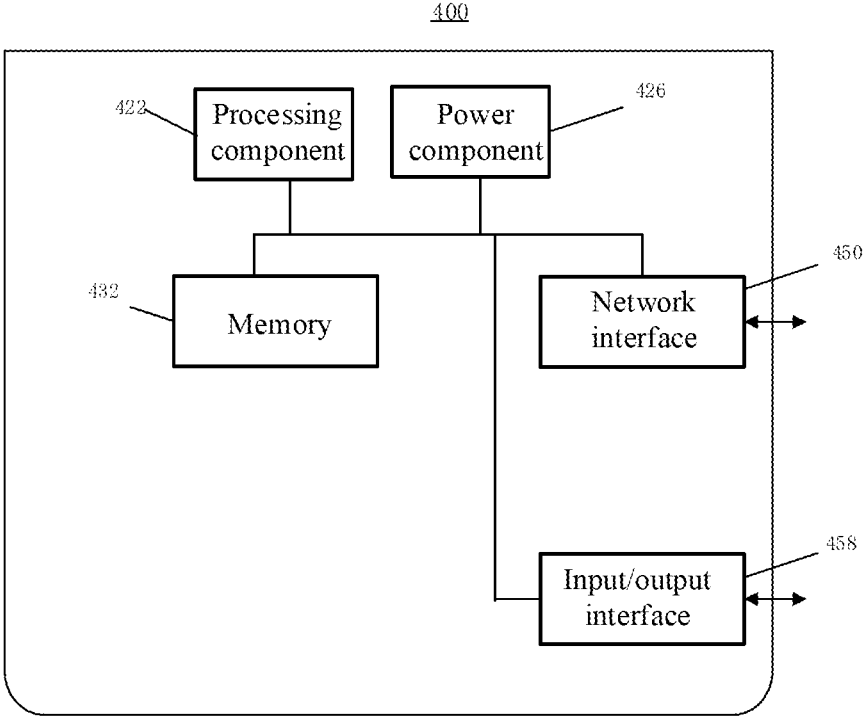
FIG. 7 is a block diagram of another apparatus for transmission illustrated according to an embodiment of the present disclosure.

FIG. 7 is a block diagram of an apparatus 400 for transmission illustrated according to an embodiment of the present disclosure. For example, an apparatus 400 may be provided as a server. Referring to FIG. 7, the apparatus 400 includes: a processing component 422, which further including one or more processors, and a memory resource represented by a memory 432, the memory resource being used for storing instructions that can be executed by a processing component 422, such as an application. The application stored in the storage medium 432 may include one or more modules, each of which corresponds to a set of instructions. In addition, the processing component 422 is configured to execute instructions, to perform the transmission method described above.

The apparatus 400 may further include a power component 426, configured to manage power supply of the apparatus 400, a wired or wireless network interface 450, configured to connect the apparatus 400 to a network, and an input/output (I/O) interface 458. The apparatus 400 may operate based on an operating system, such as Windows Server™, Mac OS X™, Unix™, Linux™, FreeBSD™ or the like, stored in the memory 432.

It can be further understood that "plurality" in the present disclosure refers to two or more, and other quantifiers are similar. "And/or" in the present disclosure describes an association relationship of associated objects, and indicates that there may be three relationships, for example, A and/or B may indicate that there are three cases: A alone, both A and B, and B alone. The character "/" generally indicates that the front and back associated objects are a relationship of "or". The singular forms "a", "the" and "said" are also intended to include plurality, unless clearly indicated otherwise in the context.

It can be further understood that the terms "first", "second", etc. are used to describe various information, but this information should not be limited to these terms. These terms are only used to distinguish one category of information from another and do not indicate a specific order or degree of importance. In fact, the expressions "first" and "second" can be used interchangeably. For example, first information may also be referred to as second information without departing from the scope of the present disclosure, and similarly, the second information may also be referred to as the first information.

It can be further understood that although the operations are described in a specific order in the accompanying drawings in the embodiments of the present disclosure, it should not be understood as requiring that these operations be performed in a specific order or serial order shown, or that all the operations shown should be performed to obtain the desired results. In certain circumstances, multitasking and parallel processing can be advantageous.

After considering the specification and practicing the present disclosure, a person skilled in the art would easily conceive of other implementations of the present disclosure.

The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be exemplary only and the real scope and spirit of the present disclosure are indicated by the claims of the present disclosure.

It should be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A transmission method, performed by a terminal, comprising:

determining a hybrid automatic repeat request (HARQ) process set;

determining partial HARQ processes in the HARQ process set based on a first information domain in downlink control information, wherein the first information domain comprises an indicator for indicating the partial HARQ processes that relate to transmission or retransmission; and transmitting or retransmitting hybrid automatic repeat request acknowledgement (HARQ-ACK) codebook information of the partial HARQ processes in the HARQ process set, wherein the HARQ process set comprises a second number of HARQ process groups, and the first information domain comprises an indicator for specifying HARQ process groups that relate to transmission or retransmission among the second number of HARQ process groups, and the indicator is a bit value; or wherein the HARQ process set comprises a fourth number of HARQ process groups, and the first information domain comprises an indicator of a third number of bits, the indicator of the third number of bits is used to indicate an index of HARQ process group that relate to transmission or retransmission.

2. The transmission method according to claim 1, wherein the HARQ process set comprises a first number of HARQ process groups, and the first information domain comprises a bitmap for indicating the first number of HARQ process groups, and the indicator is the first number of bits in the bitmap.

3. The transmission method according to claim 1, wherein the fourth number of HARQ process groups is related to the third number of bits, and the third number is less than the fourth number.

4. The transmission method according to claim 3, wherein the third number of bits are N bits, and the fourth number of HARQ process groups are 2N groups.

5. The transmission method according to claim 1, wherein the indicator for indicating the partial HARQ processes that relate to transmission or retransmission is determined based on radio resource control signaling.

6. A non-transitory computer readable storage medium, which, when instructions in the storage medium are executed by a processor of a mobile terminal, enables the mobile terminal to execute the transmission method according to claim 1.

7. The transmission method according to claim 1, wherein the second number of HARQ process groups is 2 HARQ process groups, when the bit value is 1, indicating that an HARQ process group that relates to transmission or retransmission is a first HARQ process group, and when the bit value is 0, indicating that an HARQ process group that relates to transmission or retransmission is a second HARQ process group.

8. A transmission method, performed by a network device, comprising:

determining partial hybrid automatic repeat request (HARQ) processes that relate to transmission or retransmission, wherein the partial HARQ processes are determined based on a HARQ process set; and sending downlink control information, wherein the downlink control information comprises a first information domain, and the first information domain comprises an indicator for indicating the partial HARQ processes that relate to transmission or retransmission, wherein the HARQ process set comprises a second number of HARQ process groups, and the first information domain comprises an indicator for specifying HARQ process groups that relate to transmission or retransmission among the second number of HARQ process groups, and the indicator is a bit value; or wherein the HARQ process set comprises a fourth number of HARQ process groups, and the first information domain comprises an indicator of a third number of bits, the indicator of the third number of bits is used to indicate an index of HARQ process group that relate to transmission or retransmission.

9. The transmission method according to claim 8, wherein the HARQ process set comprises a first number of HARQ process groups, and the first information domain comprises a bitmap for indicating the first number of HARQ process groups, and the indicator is the first number of bits in the bitmap.

10. The transmission method according to claim 8, wherein the fourth number of HARQ process groups is related to the third number of bits, and the third number is less than the fourth number.

11. The transmission method according to claim 8, wherein the indicator for indicating the partial HARQ processes that relate to transmission or retransmission is determined based on radio resource control signaling.

12. A transmission apparatus, comprising:

a processor; and a memory, configured to store processor-executable instructions;

wherein the processor is configured to execute the transmission method according to claim 8.

13. A non-transitory computer readable storage medium, which, when instructions in the storage medium are executed by a processor of a mobile terminal, enables the mobile terminal to execute the transmission method according to claim 8.

14. A transmission apparatus, comprising:

a processor; and a memory, configured to store processor-executable instructions;

wherein the processor is configured to:

determine a hybrid automatic repeat request (HARQ) process set;

determine partial HARQ processes in the HARQ process set based on a first information domain in downlink control information, wherein the first information domain comprises an indicator for indicating the partial HARQ processes that relate to transmission or retransmission; and transmit or retransmit hybrid automatic repeat request acknowledgement (HARQ-ACK) codebook information of the partial HARQ processes in the HARQ process set, wherein the HARQ process set comprises a second number of HARQ process groups, and the first information domain comprises an indicator for specifying HARQ process groups that relate to transmission or retransmission among the second number of HARQ process groups, and the indicator is a bit value; or wherein the HARQ process set comprises a fourth number of HARQ process groups, and the first information domain comprises an indicator of a third number of bits, the indicator of the third number of bits is used to indicate an index of HARQ process group that relate to transmission or retransmission.

* * * * *